Aug. 19, 1947.   E. W. KUHN   2,426,029
ELECTRIC MOTOR CONTROLLING APPARATUS
Filed Aug. 10, 1945   2 Sheets-Sheet 1

WITNESS
E. A. M'Closkey.

INVENTOR
Edmund W. Kuhn.
BY
Franklin E. Hardy
ATTORNEY

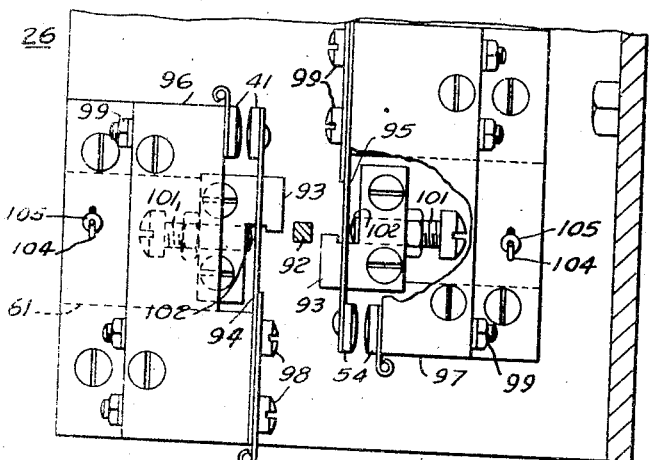
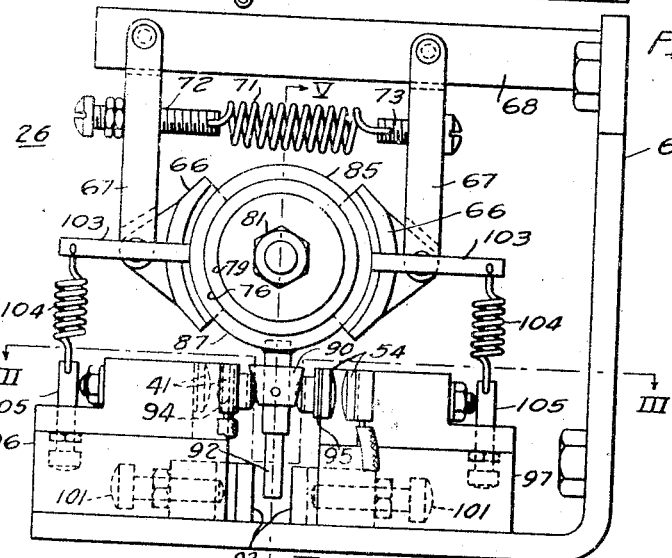
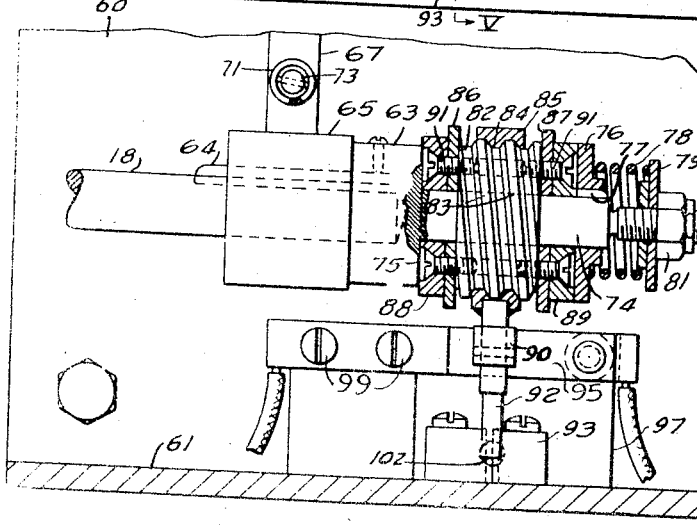
INVENTOR
Edmund W. Kuhn.
BY
Franklin E. Hardy
ATTORNEY Patented Aug. 19, 1947

2,426,029

UNITED STATES PATENT OFFICE 2,426,029

ELECTRIC MOTOR CONTROLLING APPARATUS

Edmund W. Kuhn, Cortland, Ohio, assignor to Westinghouse Electric Corporation, East Pittsburgh, Pa., a corporation of Pennsylvania Application August 10, 1945, Serial No. 610,101

7 Claims. (Cl. 172—239)

This invention relates to electrical apparatus and particularly to circuit controlling apparatus for effecting the sudden stopping of an electric motor upon interruption of the circuit supplying the energizing current for operating the motor.

In many types of apparatus such as tap-changing voltage regulators, machine tools and welding equipment, electrical mechanism is operated by a motor that is required to operate at high speed followed by a rapid deceleration of the motor speed to rest within a limited number of revolutions upon interruption of the motor circuit. In certain types of such electrical apparatus, it is customary to provide a braking mechanism of the friction type for stopping the motor and the operating mechanism associated therewith promptly upon the interruption of the motor driving circuit. Such braking mechanism is usually provided with biasing means for normally maintaining the brakes applied when the motor is deenergized and with electrically energized releasing means that is operated upon the energization of the motor to release the brakes.

It is well known that a motor may be braked dynamically by reversing the connection of its leads to the power source to effect the supply of energy to the motor from the source in a direction to create a motor torque in the reverse direction to its direction of rotation. This operation is commonly termed "plugging" the motor. Certain difficulties occur in plugging the motor of the small size customarily employed in voltage regulators or similar equipment because the inertia of the moving parts is so small that the duration of time during which the reverse direction of power is required to be applied to the motor to bring it to a complete stop without reversing the direction of operation of the motor is very short.

It is an object of my invention to provide means for stopping a motor by supplying power thereto in a direction to reverse the motor torque and for interrupting the current supplied to effect such a reverse motor torque upon the stopping of the motor.

Other objects and advantages of my invention will be apparent from the following description of a preferred embodiment thereof, reference being had to the accompanying drawing, in which:

Fig. 3 is a sectional view of the directional switch device shown in Fig. 2, taken along the line III—III of Fig. 4.

Fig. 4 is an outer end view of the device shown in Fig. 2, and

Fig. 5 is a sectional view taken on the line V—V of Fig. 4 showing a portion of the directional switch device.

Figure 1:
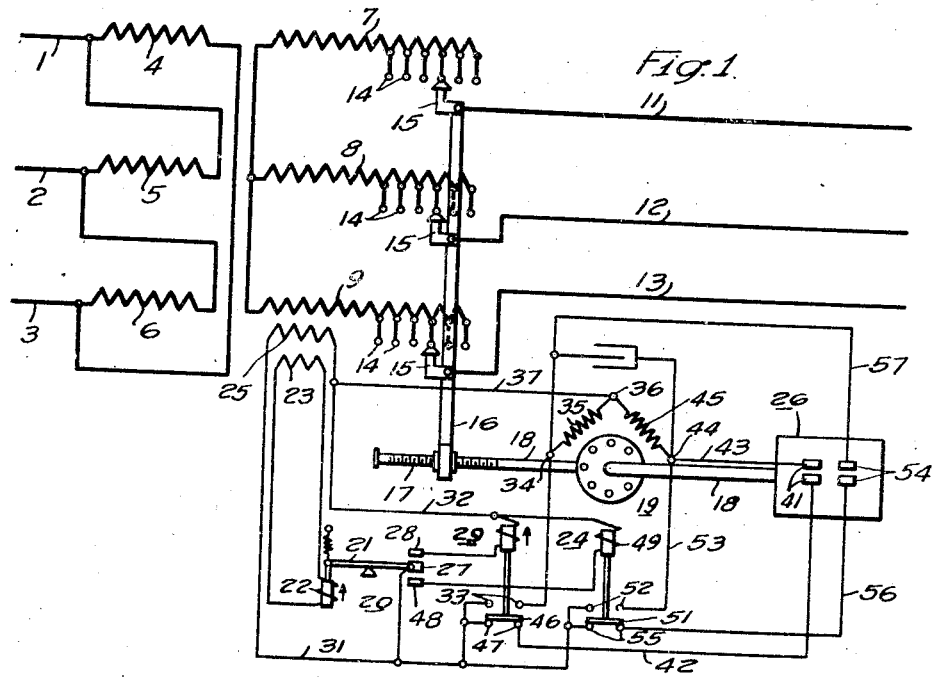
Figure 1 is a diagrammatic view of apparatus and circuits illustrating an application of the invention to a tap-changing regulating transformer.
Figure 2:
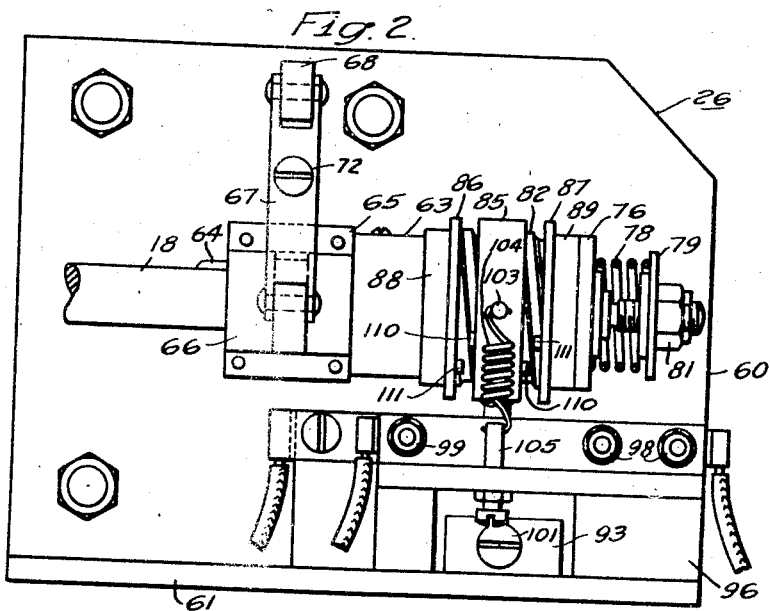
Fig. 2 is an elevational view of a directional switch device comprising a preferred embodiment of the invention.

Referring to the drawings and particularly to Fig. 1 thereof, conductors 1, 2 and 3 represent a three-phase alternating-current power circuit connected to primary transformer windings 4, 5 and 6 that are inductively related to secondary windings 7, 8 and 9 through which energy is supplied to the three-phase circuit represented by secondary conductors 11, 12 and 13. A tap-changing mechanism is provided for varying the voltage ratio between the primary circuit conductors 1, 2 and 3 and the secondary circuit conductors 11, 12 and 13 which is diagrammatically illustrated as comprising a plurality of tap-changing switch contact members 14 connected to tapped points in the secondary windings 7, 8 and 9 and cooperating with movable switch contact members 15 in each of the three phases that are similarly operated by mechanism illustrated as an arm 16 controlled by a screw threaded shaft 17 that is operated through suitable mechanical means by a motor 19.

Control equipment for the tap-changing mechanism is provided comprising a circuit controller or primary relay 20 having a pivoted arm 21 and an armature controlled by an operating winding 22 that is connected to be energized from a transformer winding 23 that is a measure of the quantity to be regulated. The primary relay 20 controls the secondary relays 29 and 24 to supply power from the transformer winding 25 to the motor 19 to effect operation of the motor in the one or the other direction to maintain the desired voltage on the power circuit 11, 12 and 13. A directional switch device 26 which may be termed a preset motor plugging switch is provided and is operated in accordance with the rotation of the motor shaft 18.

If the voltage of the secondary circuit drops below the desired value, the energization of the primary relay winding 22 is decreased permitting the armature to drop and the movable contact member 27 to engage the contact member 28 to complete a circuit from the transformer winding 25 through conductor 31, contact members 27 and 28, the windings of the relay 29 and conductor 32 to the transformer winding 25, thus energizing the relay 29, causing it to move upwardly and close a circuit from conductor 31 through relay contact members 33 to the motor terminal 34, through the motor winding 35 to motor terminal 36, and through conductor 37 back to the transformer winding 25, thus causing the motor 19 to operate in a direction to effect an operation of the tap-changing mechanism to cause an increase in the voltage on the secondary conductors 11, 12, 13. Upon operation of the motor 19, switch contact members 41 of the directional switch device 26 are brought into engagement in a manner to be later explained, closing a preset circuit including conductor 42, conductor 43, to the motor terminal 44 through the motor winding 45, terminal 36 and conductor 37, which preset circuit will be completed upon the deenergization of the relay 29 causing the relay contact member 46 to drop to its illustrated position closing the preset circuit through the relay contact members 47. This preset circuit supplies energy to the motor 19 causing it to develop a torque counter to its direction of rotation, thus rapidly bringing the motor 19 to a stop.

Upon the stopping of the motor 19, the switch contact members 41 are operated to interrupt the preset or "plugging" circuit so as to prevent operation of the motor in the reverse direction.

If the voltage of the secondary circuit 11, 12, 13 increases above the desired value, the relay 20 operates causing the contact member 27 to engage the contact member 48, thus closing a circuit through the winding 49 of the secondary relay 24 causing the relay contact member 51 to move upwardly and engage the contact members 52, closing a circuit from conductor 31, contacts 52 through conductor 53, motor terminal 44, motor winding 45, motor terminal 36 and conductor 37 to cause the motor 19 to operate in a direction to operate the tap-changing mechanism to decrease the voltage of the secondary circuit represented by conductors 11, 12 and 13. When the motor 19 is operated to increase the secondary circuit voltage, switch contact members 54 of the directional switch device 26 are operated into circuit closing relation to close a preset motor plugging circuit that will be effective when the relay contact member 51 drops to its lower position to engage lower switch contact members 55. This circuit extends from conductor 31 through relay contact members 51 and 55, conductor 56, switch contact members 54, conductor 57, to the motor terminal 34, motor winding 35, motor terminal 36 and conductor 37 to the transformer winding 25. When the voltage on the secondary circuit conductors 11, 12 and 13 has reached the desired value, the relay 20 will operate to separate contact members 27 and 48, deenergizing the secondary relay 24 and causing the relay contact member 51 to drop to its lower or illustrated position, interrupting the motor energizing circuit and completing the above traced motor plugging circuit through the secondary relay contact members 55 and directional switch contact members 54, thus applying a torque to the motor 19 in a direction reverse to its direction of operation bringing the motor to a quick stop. When the motor is brought to a stop, the directional switch device contact members 54 are separated, placing the mechanism in condition for further operation in accordance with operation of the primary relay 20.

Referring to Figs. 2, 3, 4, and 5, a directional switch device is illustrated that is effective for closing the preset motor plugging circuit. A frame consisting of a side wall 60 and bottom wall 61 is provided for supporting parts of the directional switch device. A control shaft 63 is provided and is keyed as shown at 64 to the motor shaft 18 or a shaft driven in accordance with the direction and speed of operation of the motor 19. A brake drum 65 is provided on the inner end of the control shaft 63 and is engaged by brake shoes 66 that are carried at the lower ends of levers 67, the upper ends of which are pivotally attached to an arm 68 extending outwardly from the side wall 60. A spring 71 is provided between adjusting screws 72 and 73 that are attached to the vertical arms or levers 67 to permit applying a desired brake shoe pressure to the brake drum 65.

As best shown in Fig. 5, the outer end of the control shaft 63 is reduced in diameter as shown at 74 providing a shoulder 75. A friction disk 76 is keyed to the shaft as shown at 77 and is biased by a spring 78, engaging the friction disk 76 and an outer disk 79 held in place on the end of the control shaft 63 by a nut 81. A screw member 82 is loosely mounted about the reduced portion 74 of the control shaft and provided with external screw threads 83 that are adapted to engage internal screw threads 84 of a nut member 85. Disk members 86 and 87 are provided at the opposite ends of the screw member 82 and outer friction disk members 88 and 89 are also provided for engaging the shoulder 75 and the friction disk 76, respectively. The several members, including disks 88, 86, the screw member 82, disks 87 and 89, are held together as a unit by means of screw 91, and this unit is biased to rotate in the one or the other direction with the rotation of the control shaft 63 through operation of a friction clutch comprising the shoulder 75 and friction disk 76 that are biased toward each other by the spring 78 on the opposite ends of the assembly, including the screw member 82 and the disks 88, 86, 87 and 89.

A contact arm or switch arm 92 is attached to the nut member 85 and extends downwardly therefrom, the lower end of the arm being positioned between guide blocks 93 when the nut 85 is in its central position, midway of its range of travel between the disks 86 and 87. A switch operating member 90 is carried by the arm 92 as shown on Figs. 4 and 5 and is adapted to engage the leaf spring members 94 or 95 for operating the pairs of switch contact members 41 or 54 into circuit closing positions. The leaf spring members 94 and 95, together with their associated contact members 41 and 54 are mounted on blocks of insulating material 96 and 97 by suitable screw members 98 and 99. The insulating blocks 96 and 97 are recessed to provide space for the guide blocks 93 through which stop screws 101 are positioned, the outer ends 102 of which are adapted to receive the lower end of the switch arm 92 upon movement of this arm in a direction to close the switch contact members 41 or 54.

Arms 103 are shown extending from the nut member 85 and are biased by springs 104, the lower ends of which are attached to studs 105 mounted in the insulating blocks 96 and 97, respectively. The balancing springs 104 tend to move the nut member 85 from its extreme end position between the disks 86 and 87, in which position both of the pairs of switch contact members 41 and 54 are separated. When the motor is operated in the one or in the other direction, the rotation of the screw member 82 through the friction coupling causes the nut 85 to travel in the one or in the other direction along the axis of the shaft, tending to move the contact arm 92 in a direction corresponding to the direction of rotation of the screw member 82 and the shaft operating it. The guide blocks 93 prevent the immediate movement of the contact arm until the nut 85 has traveled approximately to the end of its range of travel between the disks 86 and 87 in which position the end of the switch arm 92 will have traveled beyond the restraining surface of the guide block 93 against which it is biased, and will move in the appropriate direction to engage either the leaf spring 94 or 95 and the stop 102 to close one of the pairs of switch contact members 41 or 54, depending upon the direction in which the shaft and screw member 82 are operated. As the nut 85 is moved in the one or in the other direction along the axis of the screw member 82, projections 110 shown in Fig. 2 extending outwardly from the sides of the nut member will engage similar projections 111 on the disk members 86 or 87, preventing further rotation of the screw member 82 which would cause the screw threads to jam. A certain pressure is applied to the screw member through the friction clutch comprising the shoulder 75 and the friction disk 76 biasing the screw member assembly, including the nut 85 and the switch arm 92 in a direction corresponding to the direction of rotation of the control shaft 63 to maintain the appropriate pair of switch contact members 41 and 54 closed.

Upon operation of either of the secondary relays 29 or 24 to their circuit interrupting position to interrupt the flow of power to the motor 19, a plugging circuit is closed as above described with respect to Fig. 1 of the drawing. As soon as the motor comes to a complete stop and tends to operate in the reverse direction due to the plugging circuit, the screw assembly and the switch arm 92 tend to operate in the reverse direction. However, immediately upon the start of the motor in the reverse direction the plugging circuit is interrupted through the contact members 41 or 54, thus preventing appreciable movement of the motor in the reverse direction and again bringing the switch contact arm 92 and the nut member 85 to their mid or illustrated positions, this operation being aided by the springs 104.

It will be obvious to one skilled in the art that many modifications of the details of construction illustrated and described may be made within the spirit of the invention and I do not wish to be limited otherwise than by the scope of the appended claims.

I claim as my invention:

1. A directional switch device comprising a shaft operable in either of two directions of rotation, two pairs of switch contact members, and means operable upon the rotation of the shaft in the one or the other direction of rotation for closing the one or the other of said pairs of switch contact members, and for retaining the contact members closed so long as the shaft continues to rotate in the given direction and to separate the contact members when the shaft stops rotating, said means comprising a screw member having external screw threads thereon, a nut member having internal screw threads engaging the threads of said screw member and arranged to travel along the axis of the screw member in the one or the other direction within a predetermined range of travel, means operable by said nut upon approach to either end of its range of travel for closing the one or the other of said pairs of switch contacts, a friction clutch for biasing said screw member to rotate in the one or the other direction in accordance with the direction of rotation of the shaft and adapted to slip when the nut member reaches the end of its range of travel in either direction.

2. In a motor driven electrical apparatus, in combination, a motor, a pair of directional relays for controlling the operation of the motor in the one or the other of two directions of rotation, a preset motor plugging switch device comprising a screw member having external screw threads thereon, a nut member having internal screw threads engaging the threads of the screw member and arranged to travel along the axis of the screw member in the one or the other direction within a predetermined range, a friction clutch for biasing said screw member to rotate in the one or the other direction in accordance with the direction of rotation of the shaft and adapted to slip when the nut member reaches the end of its range of travel in either direction, said preset motor plugging switch device including two switches responsive to the movement of the nut member in the one or the other direction for presetting the one or the other of two preset plugging circuits and means responsive to the movement of a directional relay to a motor interrupting position to complete the plugging circuit, said preset switch device being effective upon the stopping of the rotation of the shaft to interrupt said plugging circuit.

3. A directional switch device comprising a shaft operable in either of two directions of rotation, a screw member having external screw threads thereon, a nut member having internal screw threads meshing with the threads of the screw member and arranged to travel along the axis of the screw member in the one or the other direction within a predetermined range, a friction clutch for biasing said screw member to rotate in the one or the other direction in accordance with the direction of rotation of the shaft and adapted to slip when the nut member reaches the end of its range of travel in either direction, a pair of switches, a switch arm operatively attached to the nut member and positioned between said pair of switches, a pair of guide blocks positioned on opposite sides of the switch arm when the nut is in the midposition of its travel along the screw member for limiting the rotation of the nut member and switch arm to prevent the operation of said pair of switches by said switch arm when the nut member is in its midposition, said switch arm being operable linearly with the nut member from its midposition upon rotation of the screw member, the guide blocks being arranged to permit lateral movement of the switch arm for operating the one or the other of said switches to a circuit closing position upon travel of the nut member to the end of its range of travel, and means operable upon completion of an operation of the directional switch device for returning the nut member and switch arm to a position to effect the return of said switch to a circuit opening position.

4. A directional switch device comprising a shaft operable in either of two directions of rotation, two pairs of switch contact members, and means operable upon the rotation of the shaft in the one or the other direction of rotation for closing the one or the other of said pairs of switch contact members, said means comprising a screw member having external screw threads thereon, a nut member having internal screw threads engaging the threads of said screw member and arranged to travel along the axis of the screw member in the one or the other direction within a predetermined range of travel, a switch arm operable by said nut in the direction of the axis of the shaft and about the axis, and effective upon movement about the axis of the shaft for closing the one or the other of said pairs of contacts, guide blocks positioned on opposite sides of the switch arm when the nut is in the midposition of its range of travel along the axis of the shaft to prevent operation of the switch contact members, said guide blocks being of a length to prevent operation of the switch arm for closing a pair of contacts until movement of the nut member adjacent the end of its range of travel in the direction of the axis of the shaft, a friction clutch for biasing said screw member to rotate in the one or the other direction in accordance with the direction of rotation of the shaft, said clutch being adapted to slip when the nut member reaches the end of its range of travel in the direction of its axis in either direction.

5. In a motor driven electrical apparatus, in combination, a motor, a pair of directional relays for controlling the operation of the motor in the one or the other of two directions of rotation, a preset motor plugging switch device comprising a screw member having external screw threads thereon, a nut member having internal screw threads engaging the threads of the screw member and arranged to travel along the axis of the screw member in the one or the other direction within a predetermined range, a friction clutch for biasing said screw member comprising frictional members attached to rotate with the shaft on opposite sides of the screw member, resilient means for biasing said friction members toward each other to transmit a frictional torque toward each other to transmit a frictional torque between the friction members and the screw member for biasing the screw member to rotate in the one or the other direction in accordance with the direction of rotation of the shaft and adapted to slip when the nut member reaches the end of its range of travel in either direction, said preset motor plugging switch device including two switches responsive to the movement of the nut member in the one or the other direction for presetting the one or the other of two preset plugging circuits, and means responsive to the movement of a directional relay to a motor interrupting position to complete the plugging circuit, said preset switch device being effective upon the stopping of the rotation of the shaft to interrupt said plugging circuit.

6. In a directional switch device comprising a shaft operable in either of two directions of rotation, a screw member having external screw threads thereon, a nut member having internal screw threads meshing with the threads of the screw member and arranged to travel along the axis of the screw member in the one or the other direction within a predetermined range, a friction clutch for biasing said screw member comprising friction members keyed to the shaft on opposite sides of the screw member, resilient means for biasing said friction members toward each other to transmit a frictional torque between the friction members and the screw member for biasing the screw member to rotate in the one or the other direction in accordance with the direction of rotation of the shaft, a pair of switches, a switch arm operatively attached to the nut member and positioned between said pair of switches, a pair of guide blocks positioned on opposite sides of the switch arm when the nut is in the midposition of its travel along the screw member for limiting the rotation of the nut member and switch arm to prevent the operation of said pair of switches by said switch arm when the nut member is in its midposition, said switch arm being operable linearly with the nut member from its midposition upon rotation of the screw member, the guide blocks being arranged to permit lateral movement of the switch arm for operating the one or the other of said switches for operating the one or the other of said switches to a circuit closing position upon travel of the nut member to the end of its range of travel, and means for coupling the nut and screw members to prevent relative rotation of the two members beyond a predetermined range of movement required for effecting operation of one of said switches.

7. A directional switch device comprising a shaft operable in either of two directions of rotation, a screw member having external screw threads thereon, a nut member having internal screw threads meshing with the threads of the screw member and arranged to travel along the axis of the screw member in the one or the other direction within a predetermined range, a friction clutch for biasing said screw member comprising friction members attached to rotate with the shaft on opposite sides of the screw member, resilient means for biasing said friction members toward each other to transmit a frictional torque between the friction members and the screw member for biasing the screw member to rotate in the one or the other direction in accordance with the direction of rotation of the shaft and adapted to slip when the nut member reaches the end of its range of travel in either direction, a pair of switches, a switch arm operatively attached to the nut member and positioned between said pair of switches, a pair of guide blocks positioned on opposite sides of the switch arm when the nut is in the midposition of its travel along the screw member for limiting the rotation of the nut member and switch arm to prevent the operation of said pair of switches by said switch arm when the nut member is in its midposition, said switch arm being operable linearly with the nut member from its midposition upon rotation of the screw member, the guide blocks being arranged to permit lateral movement of the switch arm for operating the one or the other of said switches to a circuit closing position upon travel of the nut member to the end of its range of travel, and means operable upon completion of an operation of the directional switch device for returning the nut member and switch arm to their midposition to effect the return of said switch to a circuit opening position.

EDMUND W. KUHN.

REFERENCES CITED

The following references are of record in the file of this patent:

UNITED STATES PATENTS

| Number | Name | Date |
| --- | --- | --- |
| 1,606,855 | Watson | Nov. 16, 1926 |